US011253010B2

United States Patent
Alipour et al.

(10) Patent No.: US 11,253,010 B2
(45) Date of Patent: *Feb. 22, 2022

(54) APPAREL WITH PRESSURE SENSOR CONTROL

(71) Applicant: NIKE, Inc., Beaverton, OR (US)

(72) Inventors: Hamid Alipour, Portland, OR (US); Holli Pheil, Portland, OR (US); Mark VanWeerd, Beaverton, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/859,136

(22) Filed: Apr. 27, 2020

(65) Prior Publication Data

US 2020/0253293 A1 Aug. 13, 2020

Related U.S. Application Data

(63) Continuation of application No. 15/776,694, filed as application No. PCT/US2016/062872 on Nov. 18, 2016, now Pat. No. 10,667,566.

(Continued)

(51) Int. Cl.
*A41D 1/00* (2018.01)
*G01L 1/22* (2006.01)
(Continued)

(52) U.S. Cl.
CPC .............. *A41D 1/002* (2013.01); *G01L 1/205* (2013.01); *G01L 1/2287* (2013.01); *G01L 5/008* (2013.01); *A41D 3/00* (2013.01); *A41D 27/205* (2013.01)

(58) Field of Classification Search
CPC ................... G06F 3/014; G06F 1/163; G06F 2203/04102; G06F 3/041; G06F 3/03547;
(Continued)

(56) References Cited

U.S. PATENT DOCUMENTS 10,667,566 B2 6/2020 Alipour et al.
2004/0187184 A1 9/2004 Rubin et al.
(Continued)

FOREIGN PATENT DOCUMENTS

CN 108471816 A 8/2018
CN 108471816 B 7/2021
(Continued)

OTHER PUBLICATIONS

"U.S. Appl. No. 15/776,694, Supplemental Notice of Allowability dated Apr. 30, 2020", 2 pgs.
(Continued)

*Primary Examiner* — Koosha Sharifi-Tafreshi
(74) *Attorney, Agent, or Firm* — Schwegman Lundberg & Woessner, P.A.

(57) ABSTRACT

An article of apparel and method include a structure configured to enclose a human body part, a pressure sensor array including multiple pressure sensors separately positioned at locations within the structure, wherein each pressure sensor is configured to output a signal indicative of an amount of pressure being exerted on the pressure sensor by an external mechanical force, an electronic display, and a controller. The controller is configured to receive signals from the pressure sensors and, based on a sequence and a timing of the signals as received, determine a command related to a function of a device. The electronic display is configured to display information related to the function.

44 Claims, 6 Drawing Sheets

Related U.S. Application Data

(60) Provisional application No. 62/257,544, filed on Nov. 19, 2015.

(51) Int. Cl.

| | | |
|---|---|---|
| *G01L 5/00* | (2006.01) | |
| *G01L 1/20* | (2006.01) | |
| *A41D 27/20* | (2006.01) | |
| *A41D 3/00* | (2006.01) | |

(58) Field of Classification Search
CPC .... G06F 3/045; D03D 1/0088; D03D 1/0082; H01H 2203/0085; A41D 1/002; A61B 2034/741
See application file for complete search history.

(56) References Cited

U.S. PATENT DOCUMENTS

| | | |
|---|---|---|
| 2005/0069695 A1 | 3/2005 | Jung et al. |
| 2007/0202765 A1 | 8/2007 | Krans et al. |
| 2011/0102304 A1* | 5/2011 | Nelson .................... G09G 3/00 345/46 |
| 2011/0197333 A1 | 8/2011 | Liotta |
| 2012/0323501 A1 | 12/2012 | Sarrafzadeh et al. |
| 2014/0049487 A1 | 2/2014 | Konertz et al. |
| 2014/0013241 A1 | 5/2014 | Chang |
| 2015/0091859 A1 | 4/2015 | Rosenberg et al. |
| 2015/0301671 A1 | 10/2015 | Fan et al. |
| 2015/0370320 A1 | 12/2015 | Connor |
| 2018/0343930 A1 | 12/2018 | Alipour et al. |

FOREIGN PATENT DOCUMENTS

| | | |
|---|---|---|
| CN | 113633036 | 11/2021 |
| EP | 3376888 B1 | 4/2021 |
| KR | 101326796 B1 | 11/2013 |
| WO | WO-2017087862 A1 | 5/2017 |

OTHER PUBLICATIONS

"Chinese Application Serial No. 201680078321.0, Response filed Jul. 17, 2020 to Office Action dated Mar. 2, 2020", w current English claims, claims not amended in response, 9 pgs.

U.S. Appl. No. 15/776,694, filed May 16, 2018, Apparel With Pressure Sensor Control.

"Chinese Application Serial No. 2016800783210, Office Action dated Oct. 23, 2020", w/English Translation, 49 pgs.

"Chinese Application Serial No. 2016800783210, Response filed Mar. 8, 2021 to Office Action dated Oct. 23, 2020", w/English claims, 21 pgs.

"U.S. Appl. No. 15/776,694, Non Final Office Action dated Nov. 5, 2019", 20 pgs.

"U.S. Appl. No. 15/776,694, Notice of Allowance dated Jan. 22, 2020", 5 pgs.

"U.S. Appl. No. 15/776,694, Response filed Jan. 3, 2020 to Non Final Office Action dated Nov. 5, 2019", 10 pgs.

"Chinese Application Serial No. 201680078321.0, Office Action dated Mar. 2, 2020", w/o English translation, 13 pgs.

"Chinese Application Serial No. 2016800783210, Office Action dated Jun. 5, 2019", W/English Summary, 17 pgs.

"Chinese Application Serial No. 2016800783210, Response filed Oct. 21, 2019 to Office Action dated Jun. 5, 2019", w/ English Claims, 42 pgs.

"European Application Serial No. 16867265.7, Extended European Search Report dated Jul. 12, 2019", 8 pgs.

"European Application Serial No. 16867265.7, Response filed Jan. 4, 2019 to Communication Pursuant to Rules 161 and 162 dated Jun. 29, 2018", 14 pgs.

"European Application Serial No. 16867265.7, Response filed Jan. 23, 2020 to Extended European Search Report dated Jul. 12, 2019", 17 pgs.

"International Application Serial No. PCT/US2016/062872, International Preliminary Report on Patentability dated May 31, 2018", 11 pgs.

"International Application Serial No. PCT/US2016/062872, International Search Report dated Mar. 6, 2017", 3 pgs.

"International Application Serial No. PCT/US2016/062872, Written Opinion dated Mar. 6, 2017", 9 pgs.

"Chinese Application Serial No. 2016800783210, Response to Examiner Telephone Interview filed Apr. 15, 2021", w/ English claims, 16 pgs.

"European Application Serial No. 21166912.2, Extended European Search Repost dated Sep. 8, 2021", 4 pgs.

\* cited by examiner

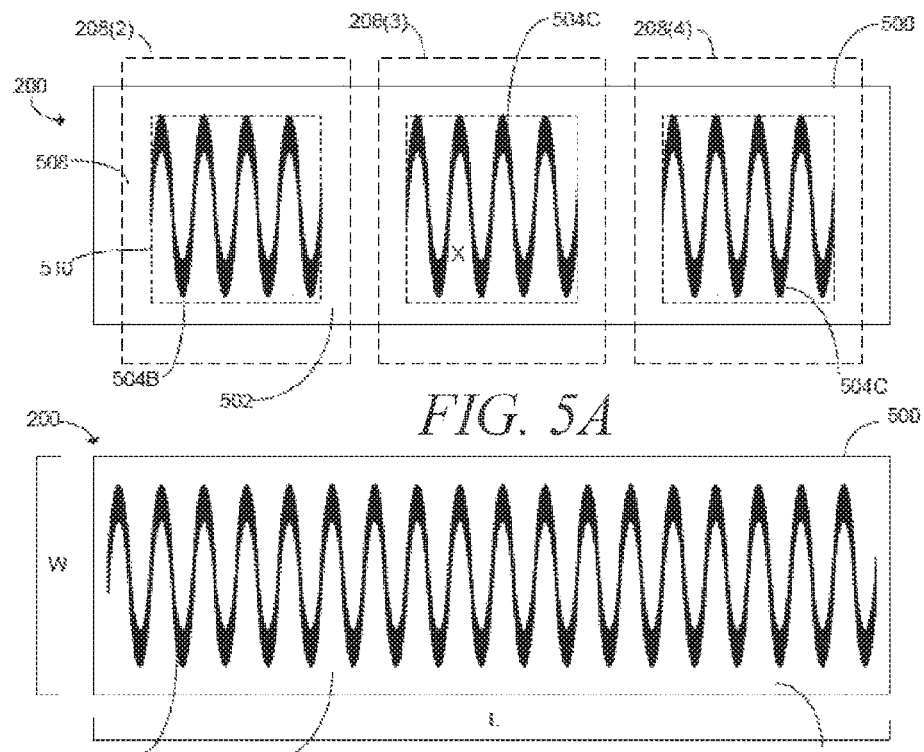
FIG. 5A
FIG. 5B
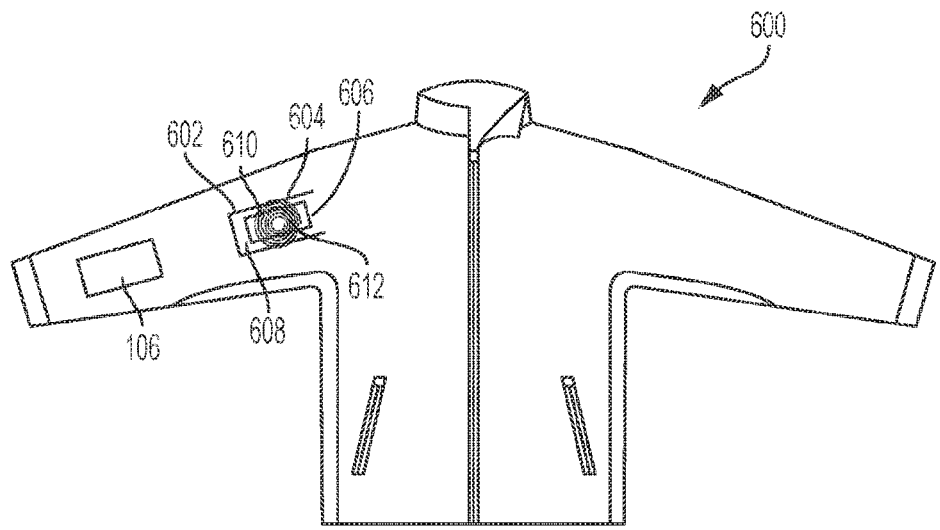
FIG. 6

APPAREL WITH PRESSURE SENSOR CONTROL

CLAIM OF PRIORITY

This application claims the benefit of priority of U.S. Provisional Patent Application Ser. No. 62/257,544, filed on Nov. 19, 2015, which is incorporated by reference herein in its entirety.

TECHNICAL FIELD

The subject matter disclosed herein generally relates to an article of apparel with a pressure sensor interface.

BACKGROUND

Articles of apparel, such as shirts, jackets, pants, footwear, and the like, have long incorporated electronics for various purposes. Shoes have incorporated lights that flash when a wearer takes a step, shirts have incorporated sensors to identify an environmental condition or a condition of a wearer, and so forth. Such articles of apparel have incorporated various mechanisms for user interfaces, ranging from accelerometers to capacitive sensors, to allow wearers and other users of the apparel to control the function of the electronics or otherwise cause an output.

BRIEF DESCRIPTION OF THE DRAWINGS

Some embodiments are illustrated by way of example and not limitation in the figures of the accompanying drawings.

FIGS. 5A and 5B are top and bottom views of an example of integrated pressure sensor assembly of a pressure sensor array, in an example embodiment.

FIG. 6 is an article of apparel that incorporates a mobile device holder positioned with respect to a wireless antenna, in an example embodiment.

DETAILED DESCRIPTION

Example methods and systems are directed to an article of apparel with a pressure sensor interface. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Attempts to integrate interactive electronic systems into apparel have included various difficulties in implementing the user interface in a way that is useful and reliable. For instance, capacitive user interfaces that run conductive wires or threads through woven fabrics may be ineffective or of reduced effectiveness if the wearer is wearing gloves or in various environmental conditions. Conventional touchscreens, such as those utilized in mobile electronic devices such as smartphones and the like, and discrete buttons may have a limited surface area and may be difficult to manipulate, particularly when the user is engaged in physical activity.

An article of apparel has been developed that provides for a user interface based on an array of sensors that may be manipulated in sequence to allow a user to input commands using large-scale movements on and/or along the article of apparel. The input sensor array is configured to be substantially isolated from environmental conditions and utilizes sensors such as pressure sensors that may be contained within layers of fabric, leather, or various textiles or materials conventionally utilized in apparel manufacture. The article of apparel further includes one or more electronic components, such as a display for presenting information, a wireless transceiver for communication with secondary devices, and environmental sensors for detecting any of a variety of conditions. The large-scale movements may be adapted to control both devices that are native or otherwise integral to the article of apparel or the function of the secondary devices.

Figure 1:
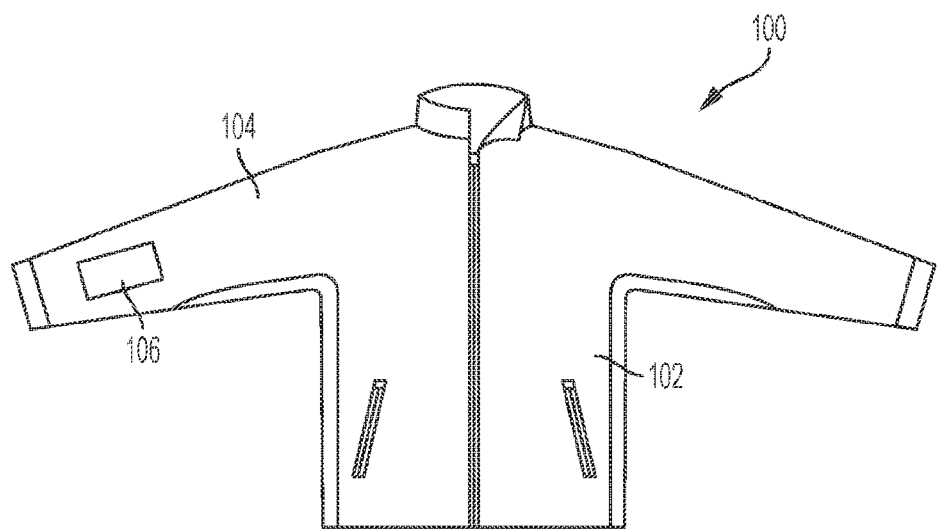
FIG. 1 is a depiction of an article of apparel, in an example embodiment.

FIG. 1 is a depiction of an article of apparel 100, in an example embodiment. As illustrated, the article of apparel 100 is based on a conventional jacket to be worn on and enclose, at least in part, the upper body, including covering the arms of a wearer. However, it is to be understood that while the principles described herein are with specific reference to the article of apparel 100, the principles described herein may be applied to any suitable article of apparel, without limitation. For the purposes of this disclosure, an article of apparel generally is understood to enclose a body part if the body party is at least partially within the article of apparel and the article of apparel in general tends to maintain the enclosure of the body part until removed. Thus, the article of apparel 100 tends to enclose the torso and arms of a wearer, a hat or cap would be understood to enclose the head, pants would be understood to enclose the hips and legs, and so forth.

The article of apparel 100 includes a general structure 102 based on a fabric, textile, or other material that may be utilized in making articles of apparel, without limitation. Embedded within the structure 102 on a sleeve 104 of the article of apparel 100 is an electronic display 106. In various examples, the electronic display 106 is an array of light emitting diodes (LEDs), but it is to be understood that the electronic display 106 may be any suitable light emitting device for any desired purpose. Such purposes may extend beyond the display of text or other visual information and may extend to aesthetic displays and the like. Moreover, the electronic display 106 is not necessarily localized but rather may additionally or alternatively include elements incorporated throughout the article of apparel 100. Thus, instead of or in addition to the electronic display 106 as illustrated, the article of apparel 100 may incorporate additional light emitting elements elsewhere on the sleeve 104 or on the chest back, collar, sides, or anywhere else on the article of apparel as desired, and for information and/or aesthetic purposes.

While an electronic display 106 is illustrated with particularity, it is to be understood that the article of apparel 100 may include any of a variety of user interface mechanisms for conveying information or other outputs to a user of the article of apparel 100. Thus, the electronic display 106 may more generally be understood to be a user interface that may output sound, haptic Feedback, or any of a variety of additional or alternative outputs that may be perceived by a user of the article of apparel 100.

Figure 2A:
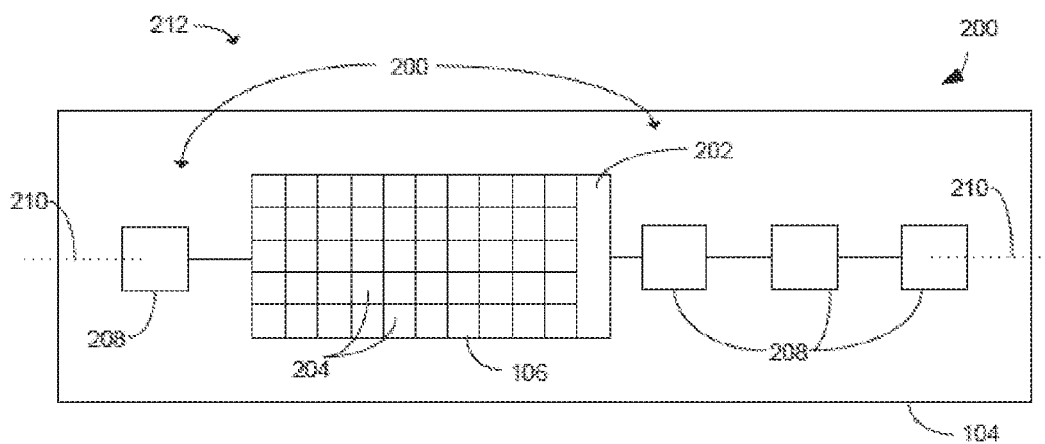
FIGS. 2A and 2B are top and side cutaway images, respectively, of a sleeve with accompanying electronics, in an example embodiment.
Figure 2B:
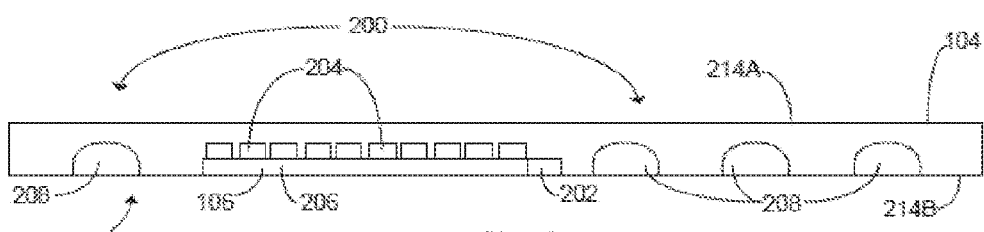

FIGS. 2A and 2B are top and side cutaway images, respectively, of the sleeve 104 with accompanying electronics, in an example embodiment. The electronics include the electronic display 106 as well as a pressure sensor array 200, all electrically coupled to control electronics 202. The control electronics 202 will be disclosed in detail herein.

While the sleeve 104 is presented as being part of the larger jacket on which the article of apparel 100 is based, in various examples the article of apparel 100 is only the sleeve 104 without the rest of the structure 102 of a jacket or larger article of apparel 100. In such an example, the sleeve 104 may be made, at least in part, from an elastic material and configured to fit snugly over a forearm of a wearer. In various examples the sleeve 104 is further configured to extend to or above the elbow of the wearer.

As illustrated, the electronic display 106 is a grid of individual LEDs 204 coupled to a substrate 206. In an example, the substrate 206 is a flexible printed circuit board (PCB) to allow for flexing of the article of apparel 100 generally in the area of the electronic display 106. In various alternative examples the substrate is a conventional rigid PCB. As illustrated, the grid or LEDs is a five (5) by twenty (20) grid for a total of one hundred (100) individual LEDs. The electronic display 106 is configured to selectively turn individual ones of the LEDs 204 off and on to display messages for view.

As further illustrated, the pressure sensor array 200 includes four individual pressure sensors 208 distributed generally along a common axis 210 of a forearm portion 212 of the sleeve 104. As shown in FIG. 2B, the electronics in general, and the pressure sensor array 200 in particular, are enclosed within and at least partially environmentally isolated by upper and lower fabric layers 214A, 214B (herein after collectively "fabric layers 214"). The fabric layers 214A, 214B are optionally but not necessarily waterproof or water resistant. The fabric layers 214 are optionally the same or different types of materials and may optionally be the same materials that for the structure 102 of the article of apparel 100 generally, including materials that are not fabric but which may be utilized in making an article of apparel 100, such as leather. The pressure sensors 208 are positioned such that a force on the top fabric layer 214A may be sensed by a nearby pressure sensor 208, which may then output a signal indicative of the sensed pressure.

While pressure sensors 208 are illustrated and described with particularity, it is to be understood that any suitable sensor may be utilized instead of or in addition to the pressure sensors 208 such that the additional or alternative sensor detects pressure or other force indicative of a touch by a user of the article of apparel 100 and may be incorporated under the upper layer 214A. Moreover, while the pressure sensors 208 in the illustrated example are arrayed along the common axis 210, it is to be understood that the pressure sensors 208 may be positioned or arrayed in any desired configuration throughout the article of apparel 100. Thus, while the pressure sensors 208 are depicted on the one sleeve 104 illustrated, various examples may have pressure sensors 208 additionally or alternatively on the other sleeve of the article of apparel 100 and/or distributed around the article of apparel 100 in locations that may be convenient or desired to be reached by a user of the article of apparel 100.

The upper fabric layer 214A covers the LEDs 204 but is sufficiently thin or otherwise opaque to allow light from the LEDs 204 to pass through and be visible to a user viewing the LEDs 204 outside of the article of apparel 100. Alternatively, the upper fabric layer 214A may be omitted from covering the LEDs 204 themselves while still covering the pressure sensor array 200 and, optionally, the substrate 206.

While the article of apparel 100 is described with respect to the pressure sensors 208, it is to be understood that the article of apparel 100 may integrate additional sensors. An accelerometer or step counter a moisture sensor or sweat sensor, a heart rate monitor, and so forth among a variety of other sensors or other data gathering implements known in the art may be incorporated and utilized in addition to the pressure sensors 208. However, at least some of the sensors utilized may still perform the functions of the pressure sensors 208 for receiving commands from a user of the article of apparel 100 as disclosed herein.

Figure 3:
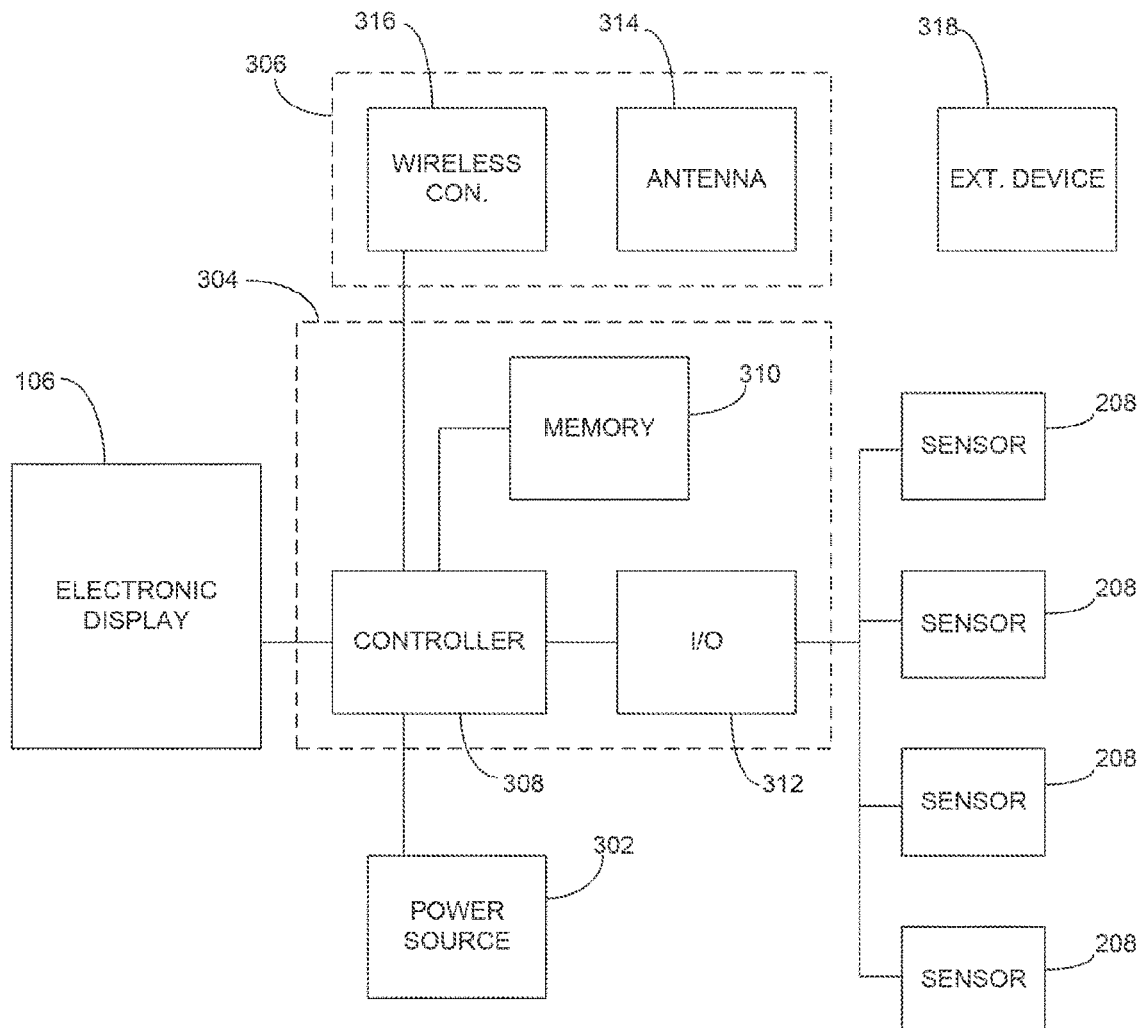
FIG. 3 is a block diagram of electronics of an article of apparel, in an example embodiment.

FIG. 3 is a block diagram 300 of the electronics of the article of apparel 100, in an example embodiment. The block diagram 300 includes the electronic display 106 and the pressure sensor array 200 of individual pressure sensors 208 and the control electronics 202. The control electronics include a power source block 302, a controller block 304, and a wireless communication block 306.

The power source block 302 includes a source of DC power, such as a battery, a super capacitor, and so forth, sufficient to provide power to the various other electronics. A battery may be a rechargeable battery or may be replaceable. Additionally or alternatively, the power source block 302 may include any of a variety of further power sources, including a piezoelectric generator or other source of power that may generate power though the movement or conventional use of the article of apparel 100. The power source block 302 optionally includes additional componentry to boost or otherwise shift the power output of the source of DC power, such as a boost converter. In an example, the power source block 302 includes a lithium ion battery configured to deliver between 3.0 and 4.2 Volts and a five (5) Volt boost converter.

The controller block 304 receives power from the power source block 302 and controls the operation of the electronic display 106 and the wireless communication block 306 and receives and processes the output of the pressure sensor array 200. The controller block 304 include a controller 308, such as a microcontroller, an electronic memory 310, such as random-access memory (RAM) or flash memory or any suitable electronic memory known in the art, and an input/output block 312, among a variety of other components that may be desired or utilized. In an example, the controller block 304 is a single system or system on a chip. In an example, the controller block 304 includes an ATmega32U4 microcontroller by Atmel Corporation as the controller 308 and related circuitry and/or by Lenoardo microcontroller board by Arduino Corporation, or any suitable controller or controller system.

When a pressure sensor 208 is depressed or otherwise senses that a user has contacted the pressure sensor 208, the pressure sensor 208 outputs a signal to the input/output block 312 of the controller block 304. The input/output block formats the signal received form the pressure sensor 208 and forwards the signal to the controller 308. The controller 308 assesses the signal from the input/output block 312 for various properties as desired, including, but not limited to, a time at which the output signal was sensed and a duration of the output signal. The controller may store such properties in the electronic memory 310 and/or act on the properties as appropriate. As will be disclosed herein, based on the nature of those or other optionally-sensed properties, the controller 308 controls the electronic display 106 and/or the wireless communication block 306.

The wireless communication block 306 includes one or more wireless antennas 314 and a wireless controller 316. The wireless antennas 314 may each be configured to communicate according to a different wireless modality, such as various versions of Bluetooth, near-field communications (NFC), ultra-high frequency (UHF), and so forth. Each wireless antenna 314 may be configured to communicate in one band or across multiple bands. The wireless controller 316 is configured to communicate according to the various wireless modalities corresponding to the one or more antennas 314. The wireless controller 316 may be a unitary device or may be multiple individual controllers each separately configured to communicate according to a different modality supported by the various antennas. In a non-limiting example, the wireless communication block 306 includes a single antenna 314 configured to communicate according to a Bluetooth standard.

The wireless communication block 306 is configured to communicate via the various modalities with one or more external devices 315 which are not themselves part of the article of apparel 100 or of a system generally. The external devices 318 may be mobile devices, such as mobile phones, smartphones, personal digital assistants (PDAs), mobile music or media players, and so forth. The external device 318 additionally or alternatively may be stationary or generally stationary, such as a race tracker or base station. The wireless communication block 306 may pair with a given external device 318 according to conventional pairing mechanisms related to the given external device 318 so as to establish a communication link between the article of apparel 100 and the external device 318.

Once the Communication link is established, depending on the capabilities and permissions of the external device 318, information may be received from the external device 318 and displayed on the electronic display 106. Further, again depending on the capabilities and permissions of the external device 318, the user of the article of apparel 100 may input commands to impact the function of the external device 318. Thus, for instance, in an example where the external device 318 is a smartphone or media player, the article of apparel 100 may receive information about a song that the smartphone or media player is currently playing, such as a title, artist, runtime, and so forth, and display that information on the electronic display 106. The user of the article of apparel 100 may perform actions with respect to the pressure sensor array 200 that the controller block 304 translates into commands to skip songs, pause music playback, increase or decrease volume, and so forth.

Additional examples of the article of apparel 100 may incorporate integrated functionality that may similarly be controlled by actions with respect to the pressure sensor array 200 and display information on the electronic display 106. For instance, the article of apparel 100 may incorporate a global positioning system (GPS) sensor and the controller block 304 may utilize positioning information to implement a fitness application that tracks position, such as a running, walking or cycling application as known in the art. In such an example, the electronic display 106 may display distance travelled, rate of travel, and other information that is conventionally displayed in such fitness applications. Actions with respect to the pressure sensor array 200 may be utilized to start and stop the fitness application and change functions during use. In such generally self-contained applications, the wireless communication block 306 may be disabled or omitted altogether.

In various examples, the controller block 304 includes as a separate component or implements with the controller 308 and/or the input/output block 312 implements an analog-to-digital converter (ADC) and rate smoothing and/or filtering of the signals from the pressure sensors 208. In various examples, the ADC converts the input analog signal from approximately zero (0) Volts to approximately five (5) Volts to and eight-bit digital signal at a sampling rate of from approximately ten (10) Hertz to fifty (50) Hertz. In an example, the sample rate is thirty (30) Hertz.

In various examples, the input/output block 312 and/or the controller 308 utilizes a tolling weighted average of the digital output from die ADC for each pressure sensor 208. In an example, the controller 308 applies a rolling weighted average of 0.2 for a current output from the ADC for the pressure sensor 208 and 0.8 for the previous rolling weighted average of the output of the pressure sensor 208. Thus, the current rolling weighted average for the output from a given pressure sensor 208 is eighty (80) percent based on the previous average and twenty (20) percent based on the current output from the ADC for that pressure sensor 208. It is noted and emphasized that each pressure sensor 208 is assessed for its rolling weighted average separately and independently.

FIGS. 4A-4D illustrate various actions for interacting with the article of apparel 100 by a user, in example embodiments. These actions are presented by way of example and it is to be understood that the principles disclosed herein may be expanded or shifted to any of a variety of alternative actions as desired. The actions may further be updated based on the nature and positioning of the individual pressure sensors 208. In the illustrated examples, the article of apparel 100 is worn such that die sleeve 104 is on the left arm of a wearer and is being manipulated by the right hand of the wearer.

Figure 4A:
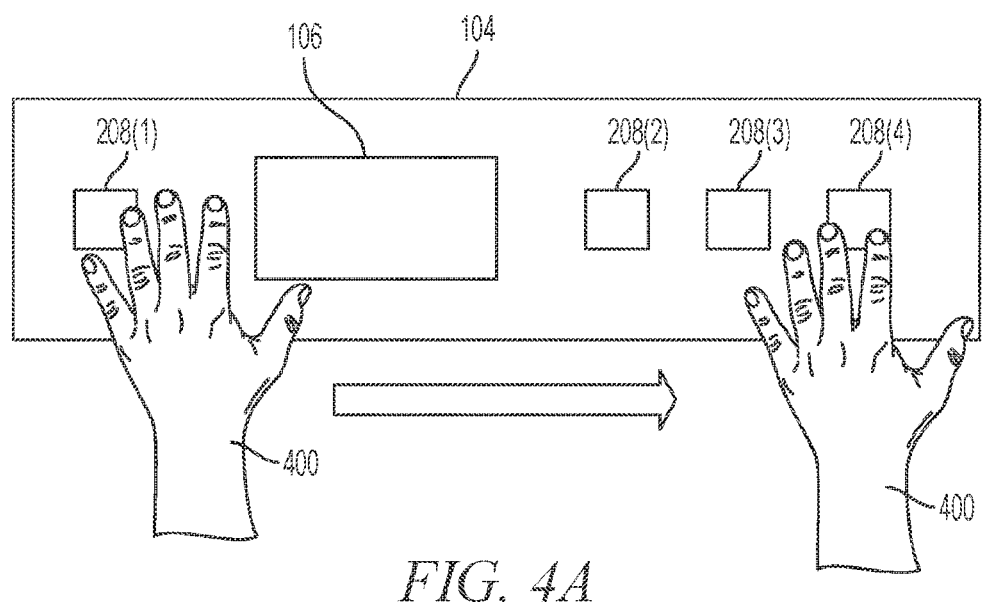
FIG. 4A-4D illustrate various actions for interacting with an article of apparel by a user, in example embodiments.

FIG. 4A illustrates an action to "swipe" the article of apparel 100 in a manner that may be interpreted as a first command from a user of the article of apparel 100. The action starts when the wearer places a hand 400 on a first pressure sensor 208(1) and inns the hand 400 along the axis 210, sequentially contacting additional pressure sensors 208(2), 208(3) et seq. In various examples, the controller block 308 recites an output signal from each of the contacted pressure sensors 208 and, based on the sequence of output signals as received by the controller block 304 identifying a corresponding command. In various examples, the sequence includes a time constraint, meaning that the output signals must, in such examples, be received within a predetermined time period, such as one (1) second, or the sequence of output signals will not be interpreted as a "swipe".

A "swipe" as illustrated does not necessarily include contacting and receiving an output signal from each of the pressure sensors 208. In various examples, contacting a subset of pressure sensors 208 may be sufficient to quality as a swipe dependent on which pressure sensors 208 are contacted. For instance, the swipe as illustrated in FIG. 4A may require contacting the first pressure sensor 208(1) and any two other pressure sensors 208(2), 208(3), 208(4). Alternatively, the swipe may require contacting any three pressure sensors 208 or any two pressure sensors 208, in various examples. In such examples, however, the output signals of the pressure sensors 208 contacted may necessarily be received in the sequence suggesting left-to-right contacting of the pressure sensors 208. Thus, the swipe may, in general, be defined as occurring according to the sequence of 208(1), 208(2), 208(3), 208(4) with omissions allowed under various rules and conditions.

As noted, the controller block 304 may interpret receipt of the "left-to-right swipe" as the first command and may control a function of either the article of apparel 100 or of an external device 318 accordingly. For instance, the left-to-right swipe may be utilized to cause a media player to play to a following song in a playlist (e.g., skip or fast-forward) or display a new contact in a mobile phone.

Figure 4B:
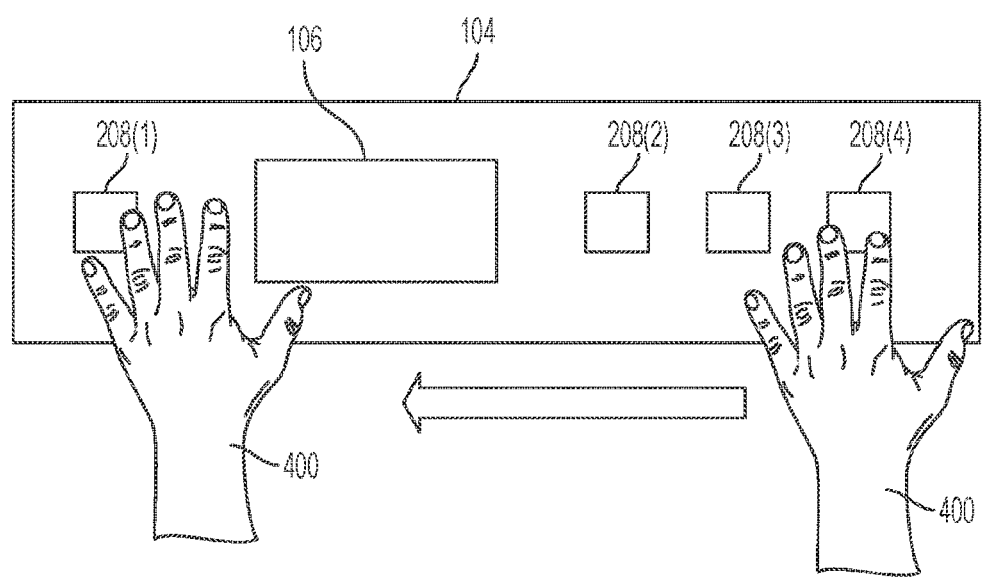

FIG. 4B illustrates a contrasting "right-to-left swipe" action, generally stalling at or near the pressure sensor 208(4) and proceeding to the left along pressure sensors 208(3), 208(2), 208(1). The principles described with respect to the left-to-right swipe illustrated in FIG. 4A may be applied as well to the right-to-left swipe. In the context of a media player, the right-to-left swipe may be interpreted as a "rewind" or "start-over" function for a current song or to skip to a preceding song, and so forth. Thus, the left-to-right swipe may be interpreted as a forward command and the right-to-left swipe may be interpreted as a backward command.

Figure 4C:
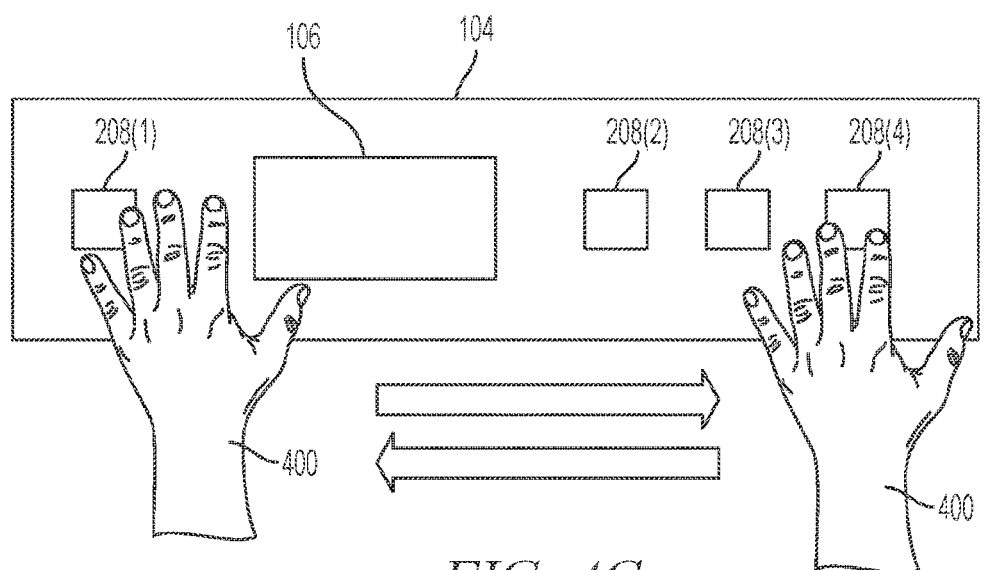

FIG. 4C illustrates a "back-and-forth swipe" action, operating on the same general principles as the swipes disclosed above but further including a repeat output signal from at least one of the pressure sensors 208. Thus, if the user starts by touching the first pressure sensor 208(1) and then proceeds to touch the second and third pressure sensors 208(2), 208(3) before again touching the second and first pressure sensors 208(2), 208(1), that sequence may be interpreted as the back-and-forth swipe. The back-and-forth swipe may variously be interpreted as exiting a menu, deleting a message, and so forth as desired.

Figure 4D:
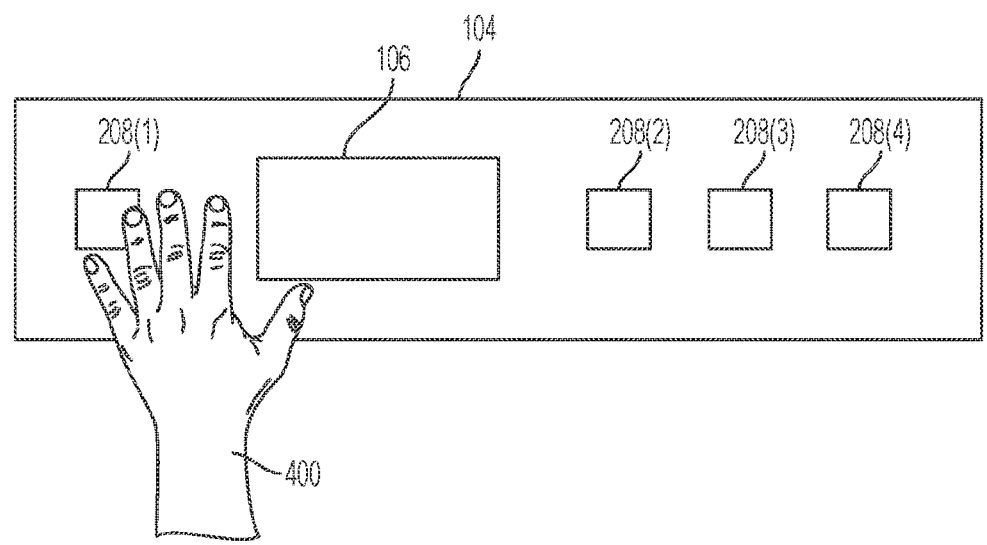

FIG. 4D illustrates a "tap" action. The tap may be interpreted according to any desired command, including to play a song or media item, call a selected contact on a mobile phone, start a fitness application, and so forth. In various examples, the tap may be location dependent or location agnostic. Thus, in a location agnostic example, the tap may be identified based on a single contact with any one pressure sensor 208, regardless of which pressure sensor 208. Alternatively, a tap may have different commands depending on which pressure senses 208 senses the tap. Thus, a tap on the first pressure sensor 208(1) may be interpreted as a different command than a tap on any of the other three pressure sensors 208(2), 208(3), 208(4). In various examples, taps may be regional. Thus, a tap on any one of the sensors 208(2), 208(3), 208(4) on the right may be interpreted as one command while a tap on the first pressure sensor 208(1) on the left may be interpreted as a second different command.

It is to be recognized and understood that the actions illustrated herein are for illustration and that any of a variety of actions may be utilized to be interpreted as commands. Furthermore, the actions may vary dependent on the positions of the pressure sensors 208 as implemented in various examples of the article of apparel 100. Thus, relatively more extensive or complicated arrangements of pressure sensors 208 may allow for relatively more involved actions.

FIGS. 5A and 5B are top and bottom views of an example of integrated pressure sensor assembly 500 of a pressure sensor array 200, in an example embodiment. The integrated pressure sensor assembly 500 includes individual pressure sensors 208 formed on a single sheet of electrically conductive film 502. The electrically conductive film 502 changes resistance when a physical force is applied to the film. Thus, when the electrically conductive film 502 is touched, whether directly or through a fabric layer 214, the resistance through the film drops. Examples of electrically conductive film include VELOSTAT™ conductive film by 3M Corporation and LINQSTAT™ conductive film by Caplinq Corporation.

An electrical conductor, such as electrically conductive thread 504, is applied to each of a first surface 506 and a second surface 508 of the electrically conductive film 502. The electrically conductive thread 504A coupled to the second surface 506 is coupled to ground. As illustrated, the electrically conductive thread 504A is, in various examples, formed into a sinusoidal or undulating pattern across substantially all of a length L and width W of the electrically conductive film 502, though in various examples the electrically conductive thread 504A may be in any patter suitable to provide adequate coverage of the second surface 506.

The electrically conductive thread 504 is applied in three separate and discrete segments 504B, 504C, 504D on the second surface 508. Each segment 504B, 504C, 504D corresponds to a separate pressure sensor 208. Where the integrated pressure sensor assembly 500 is incorporated into the example article of apparel 100 disclosed herein, each segment 504B, 504C, 504D corresponds to the second, third, and fourth pressure sensors 208(2), 208(3), 208(4), respectively. As illustrated, each segment is in a sinusoidal arrangement configured to detect changes in resistance over substantially all of an area 510 corresponding to the respective second, third, and fourth pressure sensors 208(2), 208(3), 208(4). However, it is emphasized that the integrated pressure sensor assembly 500 may be utilized as any number of pressure sensors 208 applied in any of a variety of suitable circumstances.

Though not illustrated, each electrically conductive thread 504B, 504C, 504D is electrically coupled to the controller block 304. The electrically conductive threads 504B, 504C, 504D are variously electrically coupled by extending to the controller block 304 or by being coupled to a wire that couples between the threads 504B, 504C, 504D and the controller block 304, among various potential examples. As noted, the electrically conducive film 502 loses resistance local to an external force or pressure being exerted on the electrically conductive film 502. Thus, if a force is exerted on location X then the resistance proximate the location X of the electrically conductive film 502 drops. The output signal from the pressure sensor 208(3) which overlaps the location X is, in this example, the detected drop in resistance between the electrically conductive thread 504C and the electrically conductive thread 504A on the second surface, i.e., ground. The controller block 304 is configured to detect the drop in voltage between 504C and ground and interpret that drop in voltage as the output signal indicating a force on the associated pressure sensor 208(3).

Because the force on the electrically conductive film 502 is not dependent on an external electromagnetic influence on the electrically conductive film 502, the presence of the fabric layers 214 creates little or no impediment to detecting a touch proximate the pressure sensors 208 of the integrated pressure sensor assembly 500. Thus, the integrated pressure sensor assembly 500 may be at least partially isolated against environmental conditions with little or not sacrifice of sensitivity.

FIG. 6 is an article of apparel 600 that incorporates a mobile device holder 602 positioned with respect to a wireless antenna 604, in an example embodiment. The article of apparel 600 may be an adaptation of the article of apparel 100 disclosed herein, incorporate some or all of the components of that article of apparel 100. However, the article of apparel 600 further includes the capacity to seat a mobile device that is functioning as the external device 318 and communicate according to a specified, short range wireless modality.

The holder 602 is attached to or otherwise part of the structure 102 so that a primary antenna of the mobile device is positioned with respect to the antenna 604 to facilitate wireless communication between the primary antenna and the antenna 604. As illustrated, the holder 602 is directly over the antenna 604. Various additional examples may have the holder 602 offset with respect to the antenna 604 in such a way as to still allow for wireless communication. Further, additional antennas 604 of the same type as the antenna 604 may be incorporated into the article of apparel 600 and positioned to further facilitate wireless communication as appropriate. Thus, for instance, a first antenna 604 may be positioned as illustrated while a second antenna 604 may be positioned offset with respect to the holder 602.

Further, various antennas 604 of differing types may be incorporated to allow for or otherwise facilitate communication and power transfer in a variety of different wireless bands and according to a variety of wireless communication modalities. Thus, one or more additional antennas may be incorporated that is configured to communicate in ultra-high frequency (UHF) bands, e.g., at approximately 900 MHz, among other bands. The additional antennas may be substantially co-located with the antenna 604, either closely adjacent to or partially overlapping the antenna 604, or may be positioned anywhere on the article of apparel 102 as appropriate.

The holder 602 of the illustrated forms a pocket into which a mobile device may be inserted through a top opening 606 and retained by a friction fit of a pocket material 608. The pocket material 608 may be the same as the structure 102 or may be a second material different than the structure 102. In an example, the pocket material 608 is an elastic material configured to conform to and secure the mobile device. In various examples, if the structure 102 is sufficiently elastic to retain the mobile device securely then the structure 102 may be utilized as the pocket material 608. However, if the structure 102 is insufficiently elastic then an alternative elastic material may be utilized as the pocket material 608 instead.

The holder 602 further includes an interface opening 610 configured to allow a user of the mobile device, such as a wearer of the article of apparel 100, to interface with the mobile device. For instance, in examples where the mobile device is a smartphone with a touchscreen interface, the user may interact with the user interface of the mobile device through the interface opening 610 of the holder 602. The interface opening 610 may be entirely empty of any interface material or may incorporate a covering material that may nevertheless permit interaction with a touchscreen user interface of the mobile device, as known in the art.

Various alternative examples of the holder 602 include, as an alternative to or in addition to the pocket as illustrated, brackets, cinches, straps, or any mechanical device that that may secure, attach, or otherwise retain the mobile device with respect to the antenna 604 and to the article of apparel 100 generally. Furthermore, while the holder 602 is depicted as being positioned on the sleeve of the article of apparel 600, it is to be recognized and understood that the antenna 604 and the holder 602 may be repositioned to any of a variety of positions on the article of apparel 600, in which case the construction of the holder 602 may or may not advantageously change or otherwise be configured to reflect the location of the holder 602. Thus, for instance if the holder 602 were positioned on the shoulder of the article of apparel 100 the holder 602 may be or may incorporate straps that secure the mobile device with a friction fit rather than or in addition to the pocket as illustrated. Further, additional structure may be added as necessary to As illustrated the antenna 604 is a coil antenna configured to communicate according to an NEC modality. It is noted and emphasized that the antenna 604 may be an etched antenna configured to communicate according to NFC or may be any other antenna configuration configured to communicate according to any other wireless communication modality. The antenna 604 has a major surface 612 that is parallel to a major surface of the structure 102. The holder 602 is configured to bring the primary antenna of the mobile device into substantial alignment with the antenna 604 by placing a major surface of the primary antenna substantially parallel with the major surface 612 of the antenna 604.

In an example the wireless antenna 314 may be understood to include both a first antenna configure to communicate according to a Bluetooth modality and a second antenna 604 configured to communicate according to the NEC modality. In such an example, the wireless communication block 306 may optionally be coupled to the power source block 302 to allow power to be transferred from the mobile device to the power source block 302 and from there utilized to power, in full of in part, the electronics of the article of apparel 600. In such an example, a battery may be omitted or utilized as a backup in the event that power via the antenna 604 is not available.

Figure 7:
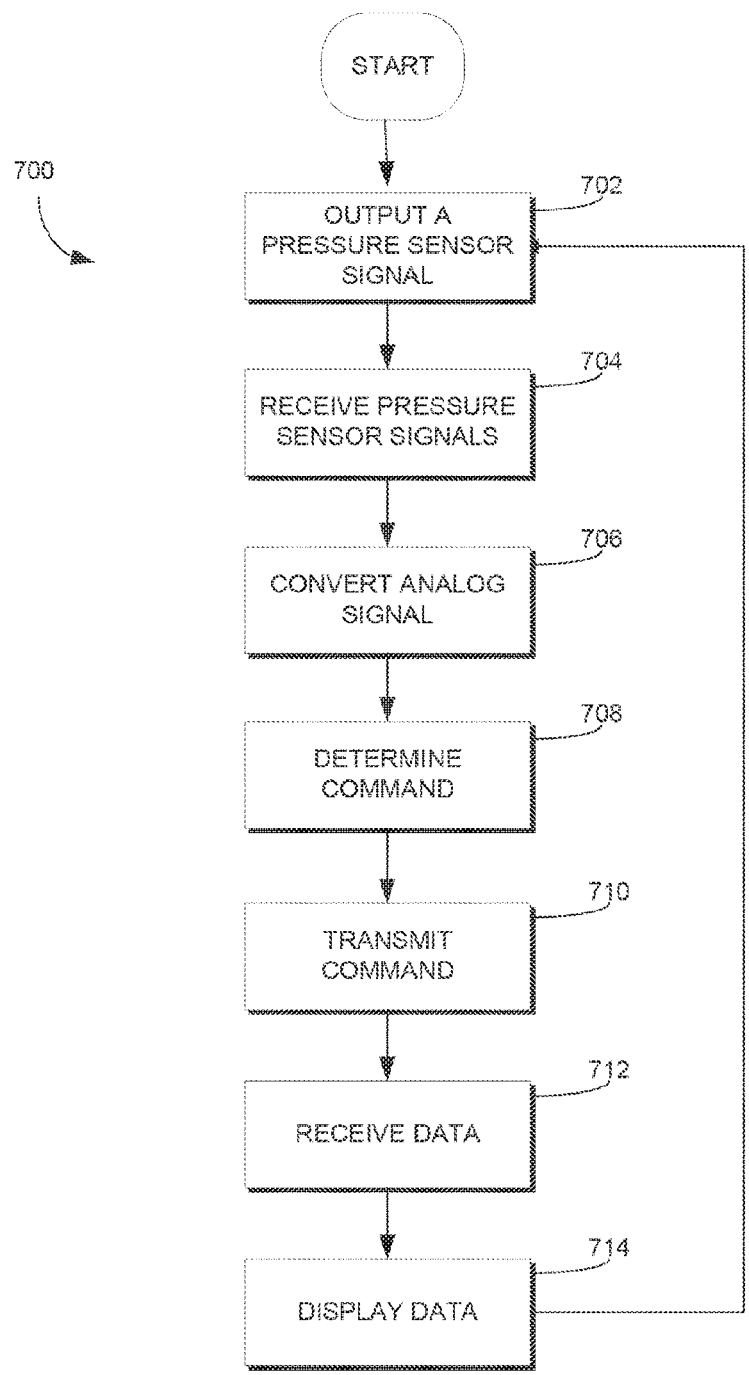
FIG. 7 is a flowchart for displaying information related to a function based on information from a pressure sensor array, in an example embodiment.

FIG. 7 is a flowchart 700 for displaying information related to a function based on information from a pressure sensor array, in an example embodiment. The flowchart 700 may be implemented with respect to the article of apparel 100 or the article of apparel 600 or with respect to any suitable article of apparel, article generally, or system generally.

At 702, each of multiple pressure sensors of a pressure sensor array output a signal indicative of an amount of pressure being exerted on the pressure sensor by an external mechanical force, the pressure sensors positioned at locations within a structure of an article of apparel configured to enclose a human body part.

In certain examples, at least some of the pressure sensors of the pressure sensor array are components of an integrated pressure sensor assembly. In an example, the integrated pressure sensor array includes an electrically conductive film having a first resistance at a location when not acted on by a mechanical force at the location and the external second resistance less than the first resistance at the location when acted on by the external mechanical force at the location, a first conductor coupled a first major surface of the electrically conductive film and to an electrical reference, and, for each pressure sensor of the integrated pressure sensor assembly, one of a plurality of second conductors separately coupled to a second major surface of the electrically conductive film and to the controller, each second conductor separately corresponding to one of the pressure sensors of the integrated pressure sensor assembly. In an example, outputting the signal includes outputting the signal indicative of the change from the first resistance to the second resistance upon the location being contacted by the external mechanical force.

In an example, the first conductor and the plurality of second conductors are arranged on the first and second major surfaces, respectively, in a sinusoidal pattern, wherein the second conductors are arranged to substantially cover a respective area of the second major surface corresponding to a location of an associated one of the multiple pressure sensors. In an example, the first conductor and the second conductors are conductive thread.

At 704, signals from the pressure sensors are received by a controller.

At 706, the signals from the pressure sensors are converted, with the controller, from analog signals to digital signals.

At 708, a command related to a function of a device is determined, with the controller, based on a sequence and a timing of the signals as received. In an example, the command is determined based on a rolling weighted average of the digital signals as converted from each of the pressure sensors. In an example, the device is an external device, and further comprising transmitting, via a wireless communication block coupled to the controller, the command to the external device, wherein the external device is configured to implement the function based on the command as received. In an example, the device is the article of apparel and wherein the function is a personal fitness function implemented by the controller and indicative of a fitness activity conducted by a wearer of the article of apparel.

In an example, the rolling weighted average for one of the pressure sensors is based on a percentage of a previously determined rolling weighted average for the pressure sensor and a percentage of a current digital signal as converted from the analog signal from the pressure sensor. In an example, the percentage of the previously determined rolling weighted average is approximately eight (80) percent and the percentage of the current digital signal is approximately twenty (20) percent.

At 710, the command is transmitted, via a wireless communication block coupled to the controller, to an external device, wherein the external device is configured to implement the function based on the command as received.

At 712, data related to the function is received, via the wireless communication block, from the external device.

At 714, information related to the function is displayed on an electronic display. In an example, the information is displayed based, further or alternatively, on data received from the external device.

As used herein, the term "memory" refers to a machine-readable medium able to store data temporarily or permanently and may be taken to include, but not be limited to, random-access memory (RAM), read-only memory (ROM), buffer memory, flash memory, ferroelectric RAM (FRAM), and cache memory. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., software) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

EXAMPLES

In Example 1, an article of apparel includes a structure configured to enclose a human body part, a pressure sensor array including multiple pressure sensors separately positioned at locations within the structure, wherein each pressure sensor is configured to output a signal indicative of an amount of pressure being exerted on the pressure sensor by an external mechanical force, a controller, coupled to the pressure sensor array, configured to receive signals from the pressure sensors and, based on a sequence and a timing of the signals as received, determine a command related to a function of a device, and an electronic display, coupled to the controller, configured to display information related to the function.

In Example 2, the article of apparel of Example 1 optionally further includes that at least some of the pressure sensors of the pressure sensor array are components of an integrated pressure sensor assembly, wherein the integrated pressure sensor assembly comprises an electrically conductive film having a first resistance at a location when not acted on by a mechanical force at the location and the external second resistance less than the first resistance at the location when acted on by the external mechanical force at the location, a first conductor coupled a first major surface of the electrically conductive film and to an electrical reference, and for each pressure sensor of the integrated pressure sensor assembly, one of a plurality of second conductors separately coupled to a second major surface of the electrically conductive film and to the controller, each second conductor separately corresponding to one of the pressure sensors of the integrated pressure sensor assembly. One of the pressure sensors proximate the location is configured to output the signal indicative of the change from the first resistance to the second resistance upon the location being contacted by the external mechanical force.

In Example 3, the article of apparel of any one or more of Examples 1 and 2 optionally further includes that the first conductor and the plurality of second conductors are arranged on the first and second major surfaces, respectively, in a sinusoidal pattern, wherein the second conductors are arranged to substantially cover a respective area of the second major surface corresponding to a location of an associated one of the multiple pressure sensors.

In Example 4, the article of apparel of any one or more of Examples 1-3 optionally further includes that the first conductor and the second conductors are conductive thread.

In Example 5, the article of apparel of any one or more of Examples 1-4 optionally further includes that the device is an external device, and further comprising a wireless communication block coupled to the controller and configured to transmit the command to the external device, wherein the external device is configured to implement the function based on the command as received.

In Example 6, the article of apparel of any one or more of Examples 1-5 optionally further includes that the wireless communication block is further configured to receive data related to the function from the external device and display the information on the electronic display based on the data.

In Example 7, the article of apparel of any one or more of Examples 1-6 optionally further includes that the device is the article of apparel and wherein the function is a personal fitness function implemented by the controller and indicative of a fitness activity conducted by a wearer of the article of apparel.

In Example 8, the article of apparel of any one or more of Examples 1-7 optionally further includes that the controller is configured to convert the signals from the pressure sensors from analog signals to digital signals and, for each of the pressure sensors, determine the command based on a rolling weighted average of the digital signals as converted from each of the pressure sensors.

In Example 9, the article of apparel of any one or more of Examples 1-8 optionally further includes that the rolling weighted average for one of the pressure sensors is based on a percentage of a previously determined rolling weighted average for the pressure sensor and a percentage of a current digital signal as converted from the analog signal from the pressure sensor.

In Example 10, the article of apparel of any one or more of Examples 1-9 optionally further includes that the percentage of the previously determined rolling weighted average is approximately eighty (80) percent and the percentage of the current digital signal is approximately twenty (20) percent.

In Example 11, a method includes outputting, for each of multiple pressure sensors of a pressure sensor array, a signal indicative of an amount of pressure being exerted on the pressure sensor by an external mechanical force, the pressure sensors positioned at locations within a structure of an article of apparel configured to enclose a human body part, receiving, with a controller, signals from the pressure sensors, determining, with the controller, based on a sequence and a timing of the signals as received, a command related to a function of a device, and displaying, on an electronic display, information related to the function.

In Example 12, the method of Example 11 optionally further includes that at least some of the pressure sensors of the pressure sensor array are components of an integrated pressure sensor assembly, wherein the integrated pressure sensor assembly comprises an electrically conductive film having a first resistance at a location when not acted on by a mechanical force at the location and the external second resistance less than the first resistance at the location when acted on by the external mechanical force at the location, a first conductor coupled a first major surface of the electrically conductive film and to an electrical reference, and for each pressure sensor of the integrated pressure sensor assembly, one of a plurality of second conductors separately coupled to a second major surface of the electrically conductive film and to the controller, each second conductor separately corresponding to one of the pressure sensors of the integrated pressure sensor assembly. Outputting the signal includes outputting the signal indicative of the change from the first resistance to the second resistance upon the location being contacted by the external mechanical force.

In Example 13, the method of any one or more of Examples 11 and 12 optionally further includes that the first conductor and the plurality of second conductors are arranged on the first and second major surfaces, respectively, in a sinusoidal pattern, wherein the second conductors are arranged to substantially cover a respective area of the second major surface corresponding to a location of an associated one of the multiple pressure sensors.

In Example 14, the method of any one or more of Examples 11-13 optionally further includes that the first conductor and the second conductors are conductive thread.

In Example 15, the method of any one or more of Examples 11-14 optionally further includes that the device is an external device, and further comprising transmitting, via a wireless communication block coupled to the controller, the command to the external device, wherein the external device is configured to implement the function based on the command as received.

In Example 16, the method of any one or more of Examples 11-15 optionally further includes receiving, via the wireless communication block, data related to the function from the external device and displaying the information on the electronic display based on the data.

In Example 17, the method of any one or more of Examples 11-16 optionally further includes that the device is the article of apparel and wherein the function is a personal fitness function implemented by the controller and indicative of a fitness activity conducted by a wearer of the article of apparel.

In Example 18, the method of any one or more of Examples 11-17 optionally further includes converting, with the controller, the signals from the pressure sensors from analog signals to digital signals, wherein the command is determined based on a rolling weighted average of the digital signals as converted front each of the pressure sensors.

In Example 19, the method of any one or more of Examples 11-18 optionally further includes that the rolling weighted average for one of the pressure sensors is based on a percentage of a previously determined rolling weighted average for the pressure sensor and a percentage of a current digital signal as converted from the analog signal from the pressure sensor.

In Example 20, the method of any one or more of Examples 11-19 optionally further includes that the percentage of the previously determined rolling weighted average is approximately eighty (80) percent and the percentage of the current digital signal is approximately twenty (20) percent.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner, in various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e g., by software) or permanently configured to perform the relevant operations. Whether temporarily or permanently configured, such processors may constitute processor-implemented modules that operate to perform one or more operations or functions described herein. As used herein. "processor-implemented module" refers to a hardware module implemented using one or more processors.

Similarly, the methods described herein may be at least partially processor-implemented, a processor being an example of hardware. For example, at least some or the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. An article of apparel, comprising:
    a structure configured to enclose a human body part;
    electronics, positioned between layers of the structure and isolated against environmental conditions, comprising:
    a pressure sensor array including multiple pressure sensors separately positioned at locations within the structure, wherein each pressure sensor is configured to output a signal indicative of an amount of pressure being exerted on the pressure sensor by an external mechanical force;
    a controller, coupled to the pressure sensor array, configured to:
    receive signals from the pressure sensors; and
    based on a sequence and a timing of the signals as received, determine a command related to a function of a device; and
    an electronic display, coupled to the controller and positioned to form a line with a first one of the pressure sensors and a second one of the pressure sensors, configured to display information related to the function through a textile layer of the layers.

2. The article of apparel of claim 1, wherein at least some of the pressure sensors of the pressure sensor array are components of an integrated pressure sensor assembly, wherein the integrated pressure sensor assembly comprises:
an electrically conductive film having a first resistance at a location when not acted on by a mechanical force at the location and the external second resistance less than the first resistance at the location when acted on by the external mechanical force at the location;
a first conductor coupled a first major surface of the electrically conductive film and to an electrical reference; and
for each pressure sensor of the integrated pressure sensor assembly, one of a plurality of second conductors separately coupled to a second major surface of the electrically conductive film and to the controller, each second conductor separately corresponding to one of the pressure sensors of the integrated pressure sensor assembly,
wherein one of the pressure sensors proximate the location is configured to output the signal indicative of the change from the first resistance to the second resistance upon the location being contacted by the external mechanical force.

3. The article of apparel of claim 2, wherein the first conductor and the plurality of second conductors are arranged on the first and second major surfaces, respectively, in a sinusoidal pattern, wherein the second conductors are arranged to substantially cover a respective area of the second major surface corresponding to a location of an associated one of the multiple pressure sensors.

4. The article of apparel of claim 2, wherein the first conductor and the second conductors are conductive thread.

5. The article of apparel of claim 1, wherein the device is an external device, and further comprising a wireless communication block coupled to the controller and configured to transmit the command to the external device, wherein the external device is configured to implement the function based on the command as received.

6. The article of apparel of claim 5, wherein the wireless communication block is further configured to receive data related to the function from the external device and display the information on the electronic display based on the data.

7. The article of apparel of claim 1, wherein the device is the article of apparel and wherein the function is a personal fitness function implemented by the controller and indicative of a fitness activity conducted by a wearer of the article of apparel.

8. The article of apparel of claim 1, wherein the controller is configured to convert the signals from the pressure sensors from analog signals to digital signals and, for each of the pressure sensors, separately determine the command based on a rolling weighted average of the digital signals as converted from each of the pressure sensors.

9. The article of apparel of claim 8, wherein the rolling weighted average for one of the pressure sensors is based on a percentage of a previously determined rolling weighted average for the pressure sensor and a percentage of a current digital signal as converted from the analog signal from the pressure sensor.

10. The article of apparel of claim 9, wherein the percentage of the previously determined rolling weighted average is approximately eighty (80) percent and the percentage of the current digital signal is approximately twenty (20) percent.

11. A method, comprising:
outputting, for each of multiple pressure sensors of a pressure sensor array, a signal indicative of an amount of pressure being exerted on the pressure sensor by an external mechanical force, the pressure sensors positioned at locations within a structure of an article of apparel configured to enclose a human body part;
receiving, with a controller, signals from the pressure sensors;
determining, with the controller, based on a sequence and a timing of the signals as received, a command related to a function of a device; and
displaying, on an electronic display positioned to form a line with a first one of the pressure sensors and a second one of the pressure sensors, information related to the function, wherein the pressure sensor array, the controller, and the electronic display are components of electronics positioned between layers of the structure and isolated against environmental conditions, the electronic display configured to display the information through a textile layer of the layers.

12. The method of claim 11, wherein at least some of the pressure sensors of the pressure sensor array are components of an integrated pressure sensor assembly, wherein the integrated pressure sensor assembly comprises:
an electrically conductive film having a first resistance at a location when not acted on by a mechanical force at the location and the external second resistance less than the first resistance at the location when acted on by the external mechanical force at the location;
a first conductor coupled a first major surface of the electrically conductive film and to an electrical reference; and
for each pressure sensor of the integrated pressure sensor assembly, one of a plurality of second conductors separately coupled to a second major surface of the electrically conductive film and to the controller, each second conductor separately corresponding to one of the pressure sensors of the integrated pressure sensor assembly;
wherein outputting the signal includes outputting the signal indicative of the change from the first resistance to the second resistance upon the location being contacted by the external mechanical force.

13. The method of claim 12, wherein the first conductor and the plurality of second conductors are arranged on the first and second major surfaces, respectively, in a sinusoidal pattern, wherein the second conductors are arranged to substantially cover a respective area of the second major surface corresponding to a location of an associated one of the multiple pressure sensors.

14. The method of claim 12, wherein the first conductor and the second conductors are conductive thread.

15. The method of claim 11, wherein the device is an external device, and further comprising transmitting, via a wireless communication block coupled to the controller, the command to the external device, wherein the external device is configured to implement the function based on the command as received.

16. The method of claim 15, further comprising:
receiving, via the wireless communication block, data related to the function from the external device; and
displaying the information on the electronic display based on the data.

17. The method of claim 11, wherein the device is the article of apparel and wherein the function is a personal fitness function implemented by the controller and indicative of a fitness activity conducted by a wearer of the article of apparel.

18. The method of claim 11, further comprising:
converting, with the controller, the signals from the pressure sensors from analog signals to digital signals; and,
separately determining, for each of the pressure sensors, the command based on a rolling weighted average of the digital signals as converted from each of the pressure sensors.

19. The method of claim 18, wherein the rolling weighted average for one of the pressure sensors is based on a percentage of a previously determined rolling weighted average for the pressure sensor and a percentage of a current digital signal as converted from the analog signal from the pressure sensor.

20. The method of claim 19, wherein the percentage of the previously determined rolling weighted average is approximately eighty (80) percent and the percentage of the current digital signal is approximately twenty (20) percent.

21. A wearable article, comprising:
a structure configured to enclose a human body part; and
an integrated pressure sensor assembly, comprising:
an electrically conductive film having a first resistance at a location when not acted on by a mechanical force at the location and a second resistance less than the first resistance at the location when acted on by the external mechanical force at the location;
a first conductor coupled a first major surface of the electrically conductive film and to an electrical reference; and
a plurality of second conductors separately coupled to a second major surface of the electrically conductive film, each second conductor separately corresponding to one of a plurality of pressure sensors separately positioned at locations within the structure, wherein each pressure sensor is configured to output a signal indicative of an amount of pressure being exerted on the pressure sensor by an external mechanical force based on a change from the first resistance to the second resistance.

22. The wearable article of claim 21, wherein the first conductor and the plurality of second conductors are arranged on the first and second major surfaces, respectively, in a sinusoidal pattern, wherein the second conductors are arranged to substantially cover a respective area of the second major surface corresponding to a location of an associated one of the multiple pressure sensors.

23. The wearable article of claim 21, wherein the first conductor and the second conductors are conductive thread.

24. The wearable article of claim 21, further comprising:
a controller configured to determine a command related to a function cof an external device based on input from the integrated pressure assembly; and
a wireless communication block coupled to the controller and configured to transmit the command to the external device, wherein the external device is configured to implement the function based on the command as received.

25. The wearable article of claim 24, wherein the wireless communication block is further configured to receive data related to the function from the external device and display the information on an electronic display based on the data.

26. The wearable article of claim 21, further comprising a controller configured to determine a command related to a function of the wearable article based on input from the integrated pressure assembly, wherein the function is a personal fitness function implemented by the controller and indicative of a fitness activity conducted by a wearer of the wearable article.

27. A wearable article, comprising:
a structure configured to enclose a human body part;
a pressure sensor assembly positioned at locations within the structure, wherein each pressure sensor is configured to output a signal indicative of an amount of pressure being exerted on the pressure sensor by an external mechanical force;
a controller, coupled to the pressure sensor assembly, configured to:
convert the signals from the pressure sensor array from analog signals to digital signals; and,
determine a command based on a rolling weighted average of the digital signals as converted;
an electronic display, coupled to the controller, configured to display information based on the command.

28. The wearable article of claim 27, wherein the rolling weighted average is based on a percentage of a previously determined rolling weighted average and a percentage of a current digital signal as converted from the analog signal from the pressure sensor.

29. The wearable article of claim 28, wherein the percentage of the previously determined rolling weighted average is approximately eighty (80) percent and the percentage of the current digital signal is approximately twenty (20) percent.

30. The wearable article of claim 27, further comprising a wireless communication block coupled to the controller and configured to transmit the command to an external device, wherein the external device is configured to implement a function based on the command as received.

31. The wearable article of claim 30, wherein the wireless communication block is further configured to receive data related to the function from the external device and display the information on the electronic display based on the data.

32. The wearable article of claim 27, wherein the command is related to a personal fitness function implemented by the controller and indicative of a fitness activity conducted by a wearer of the wearable article.

33. A method, comprising:
obtaining a structure configured to enclose a human body part; and securing an electrically conductive film to the structure, the electrically conductive film having a first resistance at a location when not acted on by a mechanical force at the location and a second resistance less than the first resistance at the location when acted on by the external mechanical force at the location;
coupling a first conductor a first major surface of the electrically conductive film and to an electrical reference; and
separately coupling a plurality of second conductors to a second major surface of the electrically conductive film to form an integrated pressure sensor assembly with the electrically conductive film and the first conductor, each second conductor separately corresponding to one of a plurality of pressure sensors separately positioned at locations within the structure, wherein each pressure sensor is configured to output a signal indicative of an amount of pressure being exerted on the pressure sensor by an external mechanical force based on a change from the first resistance to the second resistance.

34. The method of claim 33, wherein the first conductor and the plurality of second conductors are arranged on the first and second major surfaces, respectively, in a sinusoidal pattern, wherein the second conductors are arranged to substantially cover a respective area of the second major surface corresponding to a location of an associated one of the multiple pressure sensors.

35. The method of claim 33, wherein the first conductor and the second conductors are conductive thread.

36. The method of claim 33, further comprising:
coupling a controller to the integrated pressure sensor assembly, the controller configured to determine a command related to a function of an external device based on input from the integrated pressure assembly; and
coupling a wireless communication block to the controller, the wireless communication block configured to transmit the command to the external device, wherein the external device is configured to implement the function based on the command as received.

37. The method of claim 36, wherein the wireless communication block is further configured to receive data related to the function from the external device and display the information on an electronic display based on the data.

38. The method of claim 33, further comprising coupling a controller to the integrated pressure sensor assembly, the controller configured to determine a command related to a function of the wearable article based on input from the integrated pressure assembly, wherein the function is a personal fitness function implemented by the controller and indicative of a fitness activity conducted by a wearer of the wearable article.

39. A method, comprising:
obtaining a structure configured to enclose a human body part;
positioning a pressure sensor assembly at locations within the structure, wherein each pressure sensor is configured to output a signal indicative of an amount of pressure being exerted on the pressure sensor by an external mechanical force;
coupling a controller, to the pressure sensor assembly, the controller configured to:
convert the signals from the pressure sensor array from analog signals to digital signals; and,
determine a command based on a rolling weighted average of the digital signals as converted;
coupling an electronic display to the controller, the electronic display configured to display information based on the command.

40. The method of claim 39, wherein controller is configured to determine the rolling weighted average for one of the pressure sensors based on a percentage of a previously determined rolling weighted average for the pressure sensor and a percentage of a current digital signal as converted from the analog signal from the pressure sensor.

41. The method of claim 40, wherein the percentage of the previously determined rolling weighted average is approximately eighty (80) percent and the percentage of the current digital signal is approximately twenty (20) percent.

42. The method of claim 39, further comprising coupling a wireless communication block to the controller, the wireless communication block configured to transmit the command to an external device, wherein the external device is configured to implement the function based on the command as received.

43. The method of claim 42, wherein the wireless communication block is further configured to receive data related to the function from the external device; and
wherein the electronic display is further configured to display the information based on the data.

44. The method of claim 39, wherein the device is the wearable article and wherein the function is a personal fitness function implemented by the controller and indicative of a fitness activity conducted by a wearer of the wearable article.

* * * * *

UNITED STATES PATENT AND TRADEMARK OFFICE
CERTIFICATE OF CORRECTION

PATENT NO. : 11,253,010 B2
APPLICATION NO. : 16/859136
DATED : February 22, 2022
INVENTOR(S) : Alipour et al.

It is certified that error appears in the above-identified patent and that said Letters Patent is hereby corrected as shown below:

On the Title Page

On page 2, in Column 1, Item (56) under "U.S. Patent Documents", Line 8, delete "2014/0013241 A1" and insert --2014/0132410 A1-- therefor In the Claims In Column 18, Line 57, in Claim 15, delete "w herein" and insert --wherein-- therefor In Column 19, Line 55, in Claim 24, delete "cof" and insert --of-- therefor In Column 20, Line 47, in Claim 33, after "and", insert --¶--

Signed and Sealed this
Sixth Day of September, 2022

Katherine Kelly Vidal
*Director of the United States Patent and Trademark Office*